United States Patent
Ao

(10) Patent No.: US 11,486,245 B2
(45) Date of Patent: Nov. 1, 2022

(54) MICRO-ROTATING DRILLING METHOD IN DIRECTIONAL DRILLING, COMPUTER DEVICE AND READABLE STORAGE MEDIUM

(71) Applicant: Beijing Zhongshenggaoke Energy Technology Co., Ltd., Beijing (CN)

(72) Inventor: Jiangni Ao, Beijing (CN)

(73) Assignees: BEIJING ZHONGSHENGGAOKE ENERGY, Beijing (CN); TECHNOLOGY CO., LTD., Beijing (CN)

( * ) Notice: Subject to any disclaimer, the term of this patent is extended or adjusted under 35 U.S.C. 154(b) by 228 days.

(21) Appl. No.: 16/883,694

(22) Filed: May 26, 2020

(65) Prior Publication Data
US 2021/0095553 A1 Apr. 1, 2021

(30) Foreign Application Priority Data

Mar. 26, 2019 (CN) .......................... 201910230932.8

(51) Int. Cl.
*E21B 44/00* (2006.01)
*E21B 3/02* (2006.01)
(Continued)

(52) U.S. Cl.
CPC .............. *E21B 44/00* (2013.01); *E21B 3/022* (2020.05); *E21B 3/025* (2013.01); *E21B 7/06* (2013.01);
(Continued)

(58) Field of Classification Search
CPC . E21B 3/022; E21B 3/025; E21B 7/06; E21B 44/00; E21B 2200/20; E21B 2200/22; G06N 3/08
See application file for complete search history.

(56) References Cited

U.S. PATENT DOCUMENTS

2014/0000964 A1  1/2014  Selman et al.
2016/0237802 A1  8/2016  Boone et al.
(Continued)

FOREIGN PATENT DOCUMENTS

CN  103277048 A  9/2013
CN  104420861 A  3/2015
(Continued)

OTHER PUBLICATIONS

Office Action 1 along with machine English translation downloaded from EPO for Chinese Patent Application No. 201910230932.8, dated Apr. 21, 2022.
(Continued)

*Primary Examiner* — Tara Schimpf
(74) *Attorney, Agent, or Firm* — Tope-McKay & Associates

(57) ABSTRACT

The invention discloses a micro-rotating drilling method in directional drilling, a computer device and a readable storage medium. Including: acquiring rotation speed and torque and on-site drilling information; taking the rotation speed and the torque as a micro-rotating drilling state learning sample, taking the on-site drilling information as a second learning sample, inputting to a neural network control model for training, outputting a micro-rotating drilling algorithm for controlling the top drive; controlling the top drive with the micro-rotating drilling algorithm to achieve the micro-rotation operation. In the invention, an maximum torque and an maximum speed of the top drive can be continuously controlled during the operations such that the drill string can drive the drill tool to drill forward at a preset speed, static frictional resistance exerted on the drill string can be better eliminated.

12 Claims, 2 Drawing Sheets

(51) Int. Cl.
  *E21B 3/025*  (2006.01)
  *E21B 49/00*  (2006.01)
  *G06N 3/08*   (2006.01)
  *E21B 7/06*   (2006.01)

(52) U.S. Cl.
  CPC ............ *E21B 49/003* (2013.01); *G06N 3/08* (2013.01); *E21B 2200/20* (2020.05); *E21B 2200/22* (2020.05)

(56) References Cited

U.S. PATENT DOCUMENTS

| | | | |
|---|---|---|---|
| 2017/0370203 A1 | 12/2017 | Hadi | |
| 2019/0169986 A1* | 6/2019 | Storm, Jr. | E21B 49/00 |
| 2019/0301270 A1* | 10/2019 | Cobb | G06F 16/24568 |
| 2020/0248545 A1* | 8/2020 | Maus | E21B 44/00 |
| 2021/0017846 A1* | 1/2021 | Sun | G06N 20/10 |
| 2021/0108500 A1* | 4/2021 | Venugopal | G06N 20/00 |
| 2021/0148213 A1 | 5/2021 | Madasu et al. | |

FOREIGN PATENT DOCUMENTS

| | | |
|---|---|---|
| CN | 104806226 A | 7/2015 |
| CN | 3070180 A1 | 2/2019 |

OTHER PUBLICATIONS

Search Report along with machine English translation downloaded from EPO for Chinese Patent Application No. 201910230932.8, dated Apr. 21, 2022.

Hu rui, "Research on expert system of drilling engineering accident diagnosis," Journal of Shengli College of China University of petroleum, vol. 24 No.3, pp. 14-17 and 42. English translation of abstract included.

English translation of abstract from CN104420861A.
English translation of abstract from CN104806226A.
English translation of abstract from CN103277048A.
English translation of abstract from FR3070180A1.

* cited by examiner

MICRO-ROTATING DRILLING METHOD IN DIRECTIONAL DRILLING, COMPUTER DEVICE AND READABLE STORAGE MEDIUM

CROSS-REFERENCE TO RELATED APPLICATIONS

The present application claims the priority of a China application No. 201910230932.8, filed on Mar. 26, 2019 and entitled "Micro-Rotating Drilling Method and Apparatus in Directional Drilling", which is incorporated herein by reference.

TECHNICAL FIELD

The present invention relates to the technical field of oil exploration, and in particular to a micro-rotating drilling method in directional drilling, a computer device and a readable storage medium.

BACKGROUND

During a drilling operation of a directional well, especially in the process of directional drilling, the drill string is only sliding and not rotating, and the downhole well is drilled along the motor bent, which is sliding drilling. Such sliding drilling has a large static friction resistance during drilling because the entire drill string is in a sliding state (non-rotating state), and affects the drilling efficiency. Therefore, in order to ensure the drilling efficiency, it is very important to reduce the static friction resistance of the drill string during drilling.

SUMMARY

There is provided in an embodiment of the present invention a micro-rotating drilling method in directional drilling to reduce a static frictional resistance of a drill string during drilling, and the method comprises:

acquiring rotation speed data and torque data of a top drive;

acquiring on-site drilling information;

taking the rotation speed data and the torque data of the top drive as a first learning sample, taking the on-site drilling information as a second learning sample, inputting the first learning sample and the second learning sample to a neural network control model for training, and outputting a micro-rotating drilling algorithm for controlling the top drive; wherein the first learning sample is a micro-rotating drilling state learning sample, and the micro-rotating drilling state means that a torque and a rotation speed of the top drive are within a preset range; and controlling the top drive with the micro-rotating drilling algorithm to achieve the micro-rotation operation.

There is further provided in an embodiment of the invention a computer device comprising a memory, a processor and computer programs stored on the memory and executable on the processor, wherein the computer programs, when executed, cause the processor to implement the following acts of:

acquiring rotation speed data and torque data of a top drive;

acquiring on-site drilling information;

taking the rotation speed data and the torque data of the top drive as a first learning sample, taking the on-site drilling information as a second learning sample, inputting the first learning sample and the second learning sample to a neural network control model for training, and outputting a micro-rotating drilling algorithm for controlling the top drive; wherein the first learning sample is a micro-rotating drilling state learning sample, and the micro-rotating drilling state means that a torque and a rotation speed of the top drive are within a preset range; and controlling the top drive with the micro-rotating drilling algorithm to achieve the micro-rotation operation.

There is further provided in the embodiments of the present invention a computer-readable storage medium which stores a computer program for implementing the acts of:

acquiring rotation speed data and torque data of a top drive;

acquiring on-site drilling information;

taking the rotation speed data and the torque data of the top drive as a first learning sample, taking the on-site drilling information as a second learning sample, inputting the first learning sample and the second learning sample to a neural network control model for training, and outputting a micro-rotating drilling algorithm for controlling the top drive; wherein the first learning sample is a micro-rotating drilling state learning sample, and the micro-rotating drilling state means that a torque and a rotation speed of the top drive are within a preset range; and controlling the top drive with the micro-rotating drilling algorithm to achieve the micro-rotation operation.

In the embodiments of the present invention, by acquiring rotation speed data and torque data of a top drive, acquiring on-site drilling information, while generating respectively from which, a first learning sample and a second learning sample that are then inputted to a neural network control model for training, outputting a micro-rotating drilling algorithm for controlling the top drive, and controlling the top drive with the micro-rotating drilling algorithm to achieve the micro-rotation operation, an maximum torque and an maximum speed of the top drive can be continuously controlled during the operations under the micro-rotating drilling state, such that the drill string drives the drill tool to drill forward at a preset speed, and the static friction force applied thereto can be converted into a sliding friction force, and static frictional resistance exerted on the drill string can be better eliminated.

BRIEF DESCRIPTION OF THE DRAWINGS

In order to more clearly explain the embodiments of the invention or the technical solution in the prior art, drawings that need to be used in the description in embodiments or the prior art will be simply introduced below, obviously the drawings in the following description are merely some examples of the invention, for persons ordinarily skilled in the art, it is also possible to obtain other drawings according to these drawings without making creative efforts. In the drawings.

DETAILED DESCRIPTION OF THE PREFERRED EMBODIMENTS

In order to more clearly explain purpose, technical solution and advantages according to embodiments of the invention, the embodiments of the invention will be further described below in detail in combination with the drawings. Herein, the schematic embodiments of the present invention and the description thereof are used for explaining, rather than limitation to the present invention.

Figure 1:
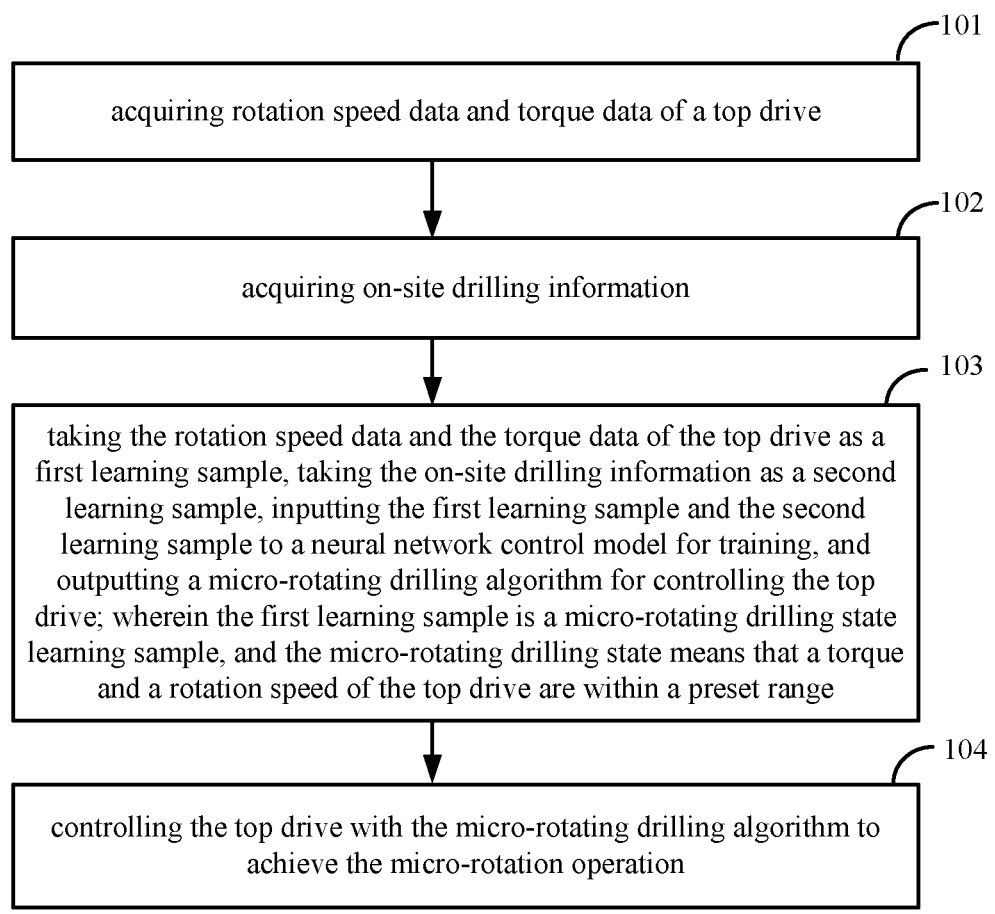
FIG. 1 is a schematic diagram of a flow chart of a micro-rotating drilling method in directional drilling according to an embodiment of the present invention.

FIG. 1 is a flow chart of a micro-rotating drilling method in directional drilling provided in an exemplary embodiment of the present application. As shown in FIG. 1, the method comprises the following steps.

Step 101: acquiring rotation speed data and torque data of a top drive.

Step 102: acquiring on-site drilling information.

Step 103: taking the rotation speed data and the torque data of the top drive as a first learning sample, taking the on-site drilling information as a second learning sample, inputting the first learning sample and the second learning sample to a neural network control model for training, and outputting a micro-rotating drilling algorithm for controlling the top drive, wherein the first learning sample is a micro-rotating drilling state learning sample, and the micro-rotating drilling state means that a torque and a rotation speed of the top drive are within a preset range.

Step 104: controlling the top drive with the micro-rotating drilling algorithm to achieve the micro-rotation operation.

In the embodiments of the present invention, by acquiring rotation speed data and torque data of a top drive, acquiring on-site drilling information, while generating respectively from which, a first learning sample and a second learning sample that are then inputted to a neural network control model for training, outputting a micro-rotating drilling algorithm for controlling the top drive, and controlling the top drive with the micro-rotating drilling algorithm to achieve the micro-rotation operation, an maximum torque and an maximum speed of the top drive can be continuously controlled during the operations under the micro-rotating drilling state, such that the drill string drives the drill tool to drill forward at a preset speed, and the static friction force applied thereto can be converted into a sliding friction force, and static frictional resistance exerted on the drill string can be better eliminated.

In the step 102, the on-site drilling information comprises formation information, drilling rig information, and instant information of a drilling process.

Exemplarily, the micro-rotating drilling state is a critical composite drilling state, which refers to a very slow or non-uniform rotating speed of the drill pipe. Usually, the maximum torque setting of the top drive is below the rotating torque. The rotating torque is the torque of the top drive during rotary drilling. Normally this value is in constant fluctuation with in a certain range.

The invention controls the drill string to reach the micro-rotatory state by taking over part of the top drive functions and continuously controlling the maximum torque setting and the maximum speed setting value of the top drive with certain micro-rotating drilling algorithm. The signal during the drilling process mentioned above includes one or more of the following: top drive torque signal, speed signal, top drive angle signal, brake state, top drive working state, forward and reverse state, speed zero signal, tool face Information, pump pressure, pump pressure difference, hook load, weight on bit, etc.

In addition, the micro-rotating drilling algorithm also needs to monitor signals in the drilling process in real time. The signal during the drilling process mentioned above includes one or more of the following: top drive torque signal, speed signal, top drive angle signal, brake state, top drive working state, forward and reverse state, speed zero signal, tool face Information, pump pressure, pump pressure difference, hook load, weight on bit, etc.

Optionally, the micro-rotating drilling algorithm also needs to obtain relevant information on rig site when necessary. The rig site related information mentioned above includes one or more of the following information: drill pipe size, well depth, well true vertical depth, inclination, drill string information, drilling fluid, etc.

With enough information of the signal of the drilling process and the relevant information of the field, the micro-rotating drilling algorithm can take over part of the top drive functions and achieve the real-time control of the top drive by transmitting the control signal, thereby achieve the micro-rotatory state during directional drilling.

Due to the insufficient wellsite conditions, some signals or information may not be available for the micro-rotating drilling kick-off algorithm. In this case, the micro-rotating drilling algorithm may open one or several internal parameters to the user to assist the operation of the micro-rotating drilling algorithm and compensate for the micro-rotating drilling algorithm caused by the lack of signal or information.

In order to control the tool surface within the target sector, the micro-rotating drilling algorithm needs to release the torque of the top drive after the each tool face correction to avoid excessive tool face change. Generally, the tool face will reversely deflect under the action of the biting effect by the drill bit. Therefore, the micro-rotating drilling algorithm will control the top drive according to the actual situation of the operation. The logic of the control is generally as below: the micro-rotating drilling algorithm controls the top drive to make the forward micro-rotation action or reverse micro-rotation action until the operation is completed.

Herein, the forward micro-rotation action is to control the top drive to perform a forward rotation to a micro-rotation stale, and then release the torque of the drill string.

The reverse micro-rotation action is to control the top drive to perform reverse rotation to the micro-rotation state, and then release the torque of the drill string.

The final action may be forward micro-rotation actions only, or may be reverse micro-rotation actions, or may be performed alternately between one or several forward micro-rotation actions and one or several reverse micro-rotation actions. The ratios of different action types are determined by the algorithm based on the actual situation on site.

In the step 104, comprises:

collecting on-site information and a feedback signal of the top drive, controlling the top drive with the micro-rotating drilling algorithm to achieve the micro-rotation operation.

Figure 2:
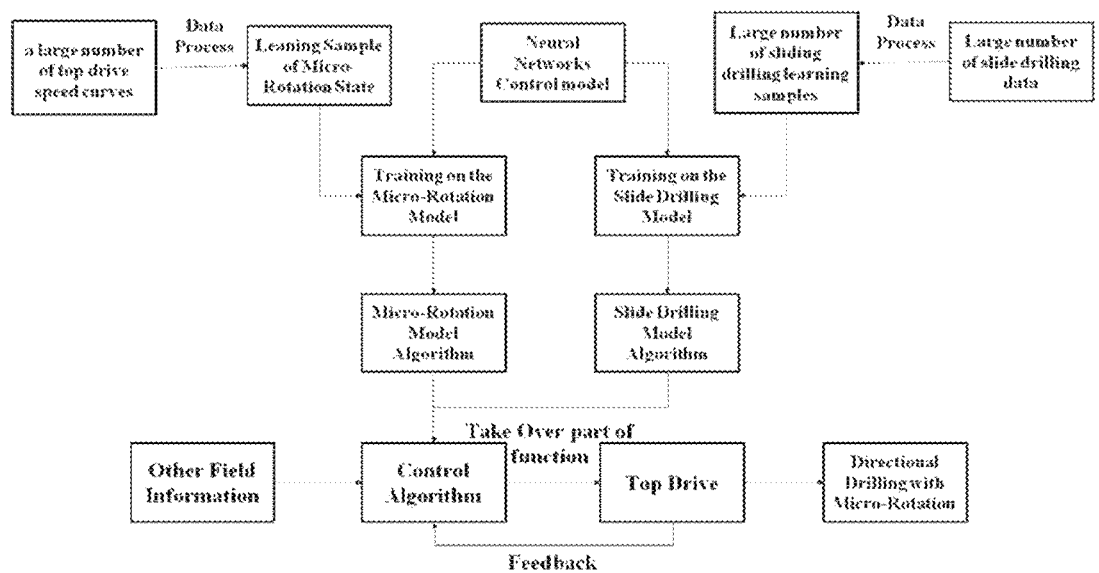
FIG. 2 is a schematic diagram of an example of a micro-rotating drilling method in directional drilling according to an embodiment of the present invention.

FIG. 2 is a specific schematic diagram of an example of a micro-rotating drilling method in directional drilling provided in an exemplary embodiment of the present application. As shown in FIG. 2, the method comprises specific steps of:

Extensively collection of a large number of top drive speed curve data, including the instantaneous information of the speed curve and torque curve;

Data processing of the above curve information as learning samples of micro-rotation;

Extensively collection of a large number of the motor directional drilling data on rig site. These information includes the formation information, rig information, real time data during drilling process, etc;

Data processing for the information above as learning samples of directional drilling;

Establish a neural network-based control model and use the above-mentioned micro-rotation learning samples and directional drilling learning samples to train the corresponding sub-procedures in the control model;

Acquire the micro-rotation algorithm after training;

Implant this algorithm in the Industrial control equipment;

Use this device to take over some functions of the top drive, such as: maximum torque setting, maximum speed setting, forward and reverse switching;

Use this equipment to collect relevant feedback signals of the top drive and related information on site;

controlling the top drive with the micro-rotating drilling algorithm to achieve the micro-rotation operation.

Based on the same inventive concept, there is further provided in the embodiments of the invention a computer device comprising a memory, a processor and computer programs stored on the memory and executable on the processor, and when executing the computer program, the processor implementing the following acts of:

acquiring rotation speed data and torque data of a top drive;

acquiring on-site drilling information;

taking the rotation speed data and the torque data of the top drive as a first learning sample, taking the on-site drilling information as a second learning sample, inputting the first learning sample and the second learning sample to a neural network control model for training, and outputting a micro-rotating drilling algorithm for controlling the top drive; wherein the first learning sample is a micro-rotating drilling state learning sample, and the micro-rotating drilling state means that a torque and a rotation speed of the top drive are within a preset range; and controlling the top drive with the micro-rotating drilling algorithm to achieve the micro-rotation operation.

There is further provided in the embodiments of the present invention a computer-readable storage medium which stores a computer program for implementing the following acts of:

acquiring rotation speed data and torque data of a top drive;

acquiring on-site drilling information;

taking the rotation speed data and the torque data of the top drive as a first learning sample, taking the on-site drilling information as a second learning sample, inputting the first learning sample and the second learning sample to a neural network control model for training, and outputting a micro-rotating drilling algorithm for controlling the top drive; wherein the first learning sample is a micro-rotating drilling state learning sample, and the micro-rotating drilling state means that a torque and a rotation speed of the top drive are within a preset range; and controlling the top drive with the micro-rotating drilling algorithm to achieve the micro-rotation operation.

In summary, in the present invention, by acquiring rotation speed data and torque data of a top drive, acquiring on-site drilling information, while generating respectively from which, a first learning sample and a second learning sample that are then inputted to a neural network control model for training, outputting a micro-rotating drilling algorithm for controlling the top drive, and controlling the top drive with the micro-rotating drilling algorithm to achieve the micro-rotation operation, an maximum torque and an maximum speed of the top drive can be continuously controlled during the operations under the micro-rotating drilling state, such that the drill string drives the drill tool to drill forward at a preset speed, and the static friction force applied thereto can be converted into a sliding friction force, and static frictional resistance exerted on the drill string can be better eliminated.

Persons skilled in the art shall understand that, the embodiments of the present invention can be provided as a method, a system or a computer program product. Therefore, the present invention can adopt the forms of a full hardware example, a full software example, or combination of a software example and a hardware example. Moreover, the present invention can adopt the form of a computer program product that is implemented on one or more computer-usable storage medium (including but not limited to a disk memory, a CD-ROM, an optical memory, etc.) including computer-usable program codes.

The invention is described with reference to flow diagrams and/or block diagrams of the method, the device (system) and the computer program product according to the embodiment of the invention. It should be understood that each flow and/or block in the flow diagrams and/or block diagrams, and the combination of the flows and/or blocks in the flow diagrams and/or block diagrams can be achieved by computer program commands. These computer program commands can be provided to a CPU of a general-purpose computer, a special-purpose computer, an embedded processor or other programmable data processing device to produce a machine, so that a device for achieving functions designated in one or more flows in the flow diagrams and/or one or more blocks in the block diagrams can be generated by the command executed by the CPU of the computer or other programmable data processing device.

These computer program instructions can also be stored in a computer-readable memory that can guide a computer or other programmable data processing device to operate in a special way, so that the instruction stored in the computer-readable memory generates a manufactured product including a instruction device which achieves functions designated in one or more flows in the flow diagrams and/or one or more blocks in the block diagrams.

These computer program instructions can also be loaded on a computer or other programmable data processing device, on which a series of operation steps are executed to generate processing achieved by the computer, so that the instruction executed on the computer or other programmable data processing device is provided for being used in the steps of achieving functions designated in one or more flows in the flow diagrams and/or one or more blocks in the block diagrams.

The purpose, technical solution and beneficial effect of the invention have been further described in detail in the above specific embodiments. It should be understood that the above contents are merely specific embodiments of the invention and are not for limiting the protection scope of the invention, and any modifications, equivalent replacements, improvements and the like within the spirit and principle of the present invention shall be included within the protection scope of the present invention.

What is claimed is:

1. A micro-rotating drilling method in directional drilling, comprising:

acquiring rotation speed data and torque data of a top drive;

acquiring on-site drilling information;

taking the rotation speed data and the torque data of the top drive as a first learning sample, taking the on-site drilling information as a second learning sample, inputting the first learning sample and the second learning sample to a neural network control model for training, and outputting a micro-rotating drilling algorithm for controlling the top drive; wherein the first learning sample is a micro-rotating drilling state learning sample, and a micro-rotating drilling state means that a torque and a rotation speed of the top drive are within a preset range; and controlling the top drive with the micro-rotating drilling algorithm to achieve the micro-rotation operation under the micro-rotating drilling state, wherein the micro-rotating drilling state is a critical composite drilling state, which refers to a very slow or non-uniform rotating speed of a drill pipe, wherein a maximum torque setting of the top drive is below a rotating torque which is the torque of the top drive during rotary drilling.

2. The micro-rotating drilling method for the directional well according to claim 1, wherein said controlling the top drive with the micro-rotating drilling algorithm to achieve the micro-rotation operation comprises: controlling the top drive to perform a forward micro-composite motion, a reverse micro-composite motion or a forward and reverse alternating motion;

wherein the forward micro-composite motion controls the top drive to rotate forward to the micro-rotating drilling state, and then to release the torque of a drill string;

wherein the reverse micro-composite motion controls the top drive to rotate reversely to the micro-rotating drilling state, and then to release the torque of the drill string.

3. The micro-rotating drilling method for the directional well according to claim 1, wherein the on-site drilling information comprises: formation information, drilling rig information, and instant information of a drilling process.

4. The micro-rotating drilling method for the directional well according to claim 1, wherein said controlling the top drive with the micro-rotating drilling algorithm to achieve the micro-rotation operation comprises:

collecting the on-site drilling information and a feedback signal of the top drive, controlling the top drive with the micro-rotating drilling algorithm to achieve the micro-rotation operation.

5. A computer device comprising a memory, a processor and computer programs stored on the memory and executable on the processor, wherein the computer programs, when executed, cause the processor to implement the following acts of:

acquiring rotation speed data and torque data of a top drive;

acquiring on-site drilling information;

taking the rotation speed data and the torque data of the top drive as a first learning sample, taking the on-site drilling information as a second learning sample, inputting the first learning sample and the second learning sample to a neural network control model for training, and outputting a micro-rotating drilling algorithm for controlling the top drive; wherein the first learning sample is a micro-rotating drilling state learning sample, and the micro-rotating drilling state means that a torque and a rotation speed of the top drive are within a preset range; and controlling the top drive with the micro-rotating drilling algorithm to achieve the micro-rotation operation under the micro-rotating drilling state, wherein the micro-rotating drilling state is a critical composite drilling state, which refers to a very slow or non-uniform rotating speed of a drill pipe, wherein a maximum torque setting of the top drive is below a rotating torque which is the torque of the top drive during rotary drilling.

6. The computer device according to claim 5, wherein the computer programs, when executed, cause the processor to implement the following acts of:

controlling the top drive to perform a forward micro-composite motion, a reverse micro-composite motion or a forward and reverse alternating motion;

wherein the forward micro-composite motion controls the top drive to rotate forward to the micro-rotating drilling state, and then to release the torque of a drill string;

wherein the reverse micro-composite motion controls the top drive to rotate reversely to the micro-rotating drilling state, and then to release the torque of the drill string.

7. The computer device according to claim 5, wherein the on-site drilling information comprises: formation information, drilling rig information, and instant information of a drilling process.

8. The computer device according to claim 5, wherein the computer programs, when executed, cause the processor to implement the following acts of: collecting the on-site drilling information and a feedback signal of the top drive, controlling the top drive with the micro-rotating drilling algorithm to achieve the micro-rotation operation.

9. A computer-readable storage medium, wherein the computer-readable storage medium stores computer programs for implementing the acts of:

acquiring rotation speed data and torque data of a top drive;

acquiring on-site drilling information;

taking the rotation speed data and the torque data of the top drive as a first learning sample, taking the on-site drilling information as a second learning sample, inputting the first learning sample and the second learning sample to a neural network control model for training, and outputting a micro-rotating drilling algorithm for controlling the top drive; wherein the first learning sample is a micro-rotating drilling state learning sample, and the micro-rotating drilling state means that a torque and a rotation speed of the top drive are within a preset range; and controlling the top drive with the micro-rotating drilling algorithm to achieve the micro-rotation operation under the micro-rotating drilling state, wherein the micro-rotating drilling state is a critical composite drilling state, which refers to a very slow or non-uniform rotating speed of a drill pipe, wherein a maximum torque setting of the top drive is below a rotating torque which is the torque of the top drive during rotary drilling.

10. The computer-readable storage medium according to claim 9, wherein the computer programs are used for implementing the following acts of:

controlling the top drive to perform a forward micro-composite motion, a reverse micro-composite motion or a forward and reverse alternating motion;

wherein the forward micro-composite motion controls the top drive to rotate forward to the micro-rotating drilling state, and then to release the torque of a drill string;

wherein the reverse micro-composite motion controls the top drive to rotate reversely to the micro-rotating drilling state, and then to release the torque of the drill string.

11. The computer-readable storage medium according to claim 9, wherein the on-site drilling information comprises:

formation information, drilling rig information, and instant information of a drilling process.

12. The computer-readable storage medium according to claim 9, wherein the computer programs are used for implementing the following acts of: collecting the on-site drilling information and a feedback signal of the top drive, controlling the top drive with the micro-rotating drilling algorithm to achieve the micro-rotation operation.

* * * * *